US012031704B2

(12) United States Patent
Jiang

(10) Patent No.: US 12,031,704 B2
(45) Date of Patent: Jul. 9, 2024

(54) INTELLIGENT FOCUSING METHOD OF INTELLIGENT MOVING HEAD LIGHT BASED ON MACHINE VISION

(71) Applicant: Guangzhou Haoyang Electronic Co., Ltd., Guangdong (CN)

(72) Inventor: Weikai Jiang, Guangdong (CN)

(73) Assignee: Guangzhou Haoyang Electronic Co., Ltd. (CN)

( * ) Notice: Subject to any disclaimer, the term of this patent is extended or adjusted under 35 U.S.C. 154(b) by 723 days.

(21) Appl. No.: 17/182,475

(22) Filed: Feb. 23, 2021

(65) Prior Publication Data
US 2021/0172589 A1 Jun. 10, 2021

Related U.S. Application Data

(63) Continuation of application No. PCT/CN2020/111673, filed on Aug. 27, 2020.

(30) Foreign Application Priority Data

Oct. 31, 2019 (CN) .......................... 201911055429.X

(51) Int. Cl.
*F21V 21/14* (2006.01)
*G02B 7/36* (2021.01)
(Continued)

(52) U.S. Cl.
CPC ............... *F21V 21/14* (2013.01); *G02B 7/36* (2013.01); *G06T 5/73* (2024.01); *G06T 7/0002* (2013.01);
(Continued)

(58) Field of Classification Search
CPC ............ G02B 7/36; F21W 2131/105; F21W 2131/406; G06T 5/003; G06T 7/0002; F21V 21/14; H05B 47/105
(Continued)

(56) References Cited

U.S. PATENT DOCUMENTS

2017/0019582 A1* 1/2017 Lv ............................ G02B 7/36
2017/0045812 A1* 2/2017 Chen ................... G02B 13/001
2021/0096243 A1* 4/2021 Gafner ..................... G01S 15/89

FOREIGN PATENT DOCUMENTS

CN         2000180707 A       6/2000
CN          102520503 A  *    6/2012
(Continued)

OTHER PUBLICATIONS

International Search Report including Written Opinion for PCT/CN2020/111673 dated Nov. 25, 2020; 10 pages.

*Primary Examiner* — Stephone B Allen
*Assistant Examiner* — Leonidas Boutsikaris
(74) *Attorney, Agent, or Firm* — Lerner David LLP

(57) ABSTRACT

An intelligent focusing method of an intelligent moving head light based on machine vision includes the following steps: prestoring coordinate positions $Z_{21}$ and $Z_{22}$ of the focusing assembly corresponding to stage light projection distances $S_{max}$ and $S_{min}$ respectively, moving the focusing assembly to a position between $Z_{21}$ and $Z_{22}$ after the controller receives a command to start an automatic focusing function; gradually moving the focusing assembly between $Z_{21}$ and $Z_{22}$ by a focusing search strategy, calculating a sharpness evaluation value $T_n$ of a current projected image according to an image sharpness evaluation function, and determining whether $T_n$ is greater than a preset high sharpness threshold $T_H$ if yes, completing the focusing, otherwise determining whether $T_n$ is less than or equal to $T_{n-1}$, if yes, driving the stepper motor by the driver to operate in an opposite direction, otherwise driving the stepper motor by the driver to operate in an original direction, until $T_n$ is greater than $T_H$.

11 Claims, 3 Drawing Sheets

(51) Int. Cl.
  *G06T 5/73* (2024.01)
  *G06T 7/00* (2017.01)
  *H05B 47/105* (2020.01)
  *F21Y 115/10* (2016.01)

(52) U.S. Cl.
  CPC ........ *H05B 47/105* (2020.01); *F21Y 2115/10* (2016.08)

(58) Field of Classification Search
  USPC ........................................................ 359/694
  See application file for complete search history.

(56) References Cited

FOREIGN PATENT DOCUMENTS

| | | | | |
|---|---|---|---|---|
| CN | 102520503 A | | 6/2012 | |
| CN | 104633599 A | * | 5/2015 | .............. F21V 14/06 |
| CN | 104633599 A | | 5/2015 | |
| CN | 106842496 A | | 6/2017 | |
| CN | 107743194 A | | 2/2018 | |
| CN | 208332073 U | | 1/2019 | |
| CN | 110793000 A | | 2/2020 | |

* cited by examiner

INTELLIGENT FOCUSING METHOD OF INTELLIGENT MOVING HEAD LIGHT BASED ON MACHINE VISION

CROSS REFERENCE TO RELATED APPLICATIONS

The present application is a continuation of International Application No. PCT/CN2020/111673, filed on Aug. 27, 2020, which claims priority from Chinese Patent Application No. 201911055429.X filed on Oct. 31, 2019, all of which are hereby incorporated herein by reference.

TECHNICAL FIELD

The invention relates to the field of stage lights, in particularly to an intelligent focusing method of a stage intelligent moving head light based on machine vision.

BACKGROUND

As an important optical device that provides clear, brilliant and colorful beam effects, an intelligent moving head light is often used in stage scenes, such as concerts, concert halls and studios, where contrasts of lighting effects are strong, backgrounds are complex and changeable, and projection distances change at any time. In a follow spot scene on the stage, it is guaranteed that a beam projected by the light fixture can keep up with a stage object while maintaining imaging sharpness of the light by manual focusing at any time. However, when multiple lights are controlled simultaneously to shine a spotlight on one or more objects, an existing focusing mode has slow focusing speed and is required to improve real-time performance. With developments of performing arts field and digital image processing technology, it would be desirable to realize a fast and accurate intelligent focusing function with clear imaging in intelligent moving head lights.

SUMMARY

The invention aims to overcome at least one of the above-mentioned deficiencies in the prior art and provides an intelligent focusing method of an intelligent moving head light based on machine vision, which effectively solves problems of poor focusing sharpness and real-time performance when multiple lights are controlled to be follow spotlights at the same time, improves a degree of automation control in stage lighting technologies, and improves quality of performance with lighting.

A technical solution adopted by the present invention is as follows.

An intelligent focusing method of an intelligent moving head light based on machine vision is provided, in which the intelligent moving head light includes a controller, a camera, a driver, a stepper motor and an optical lens assembly that includes a focusing assembly and a zooming assembly. The intelligent focusing method includes the following steps:

S1, prestoring coordinate positions $Z_{21}$ and $Z_{22}$ of the focusing assembly corresponding to stage light projection distances $S_{max}$ and $S_{min}$ respectively, and moving the focusing assembly to a position between $Z_{21}$ and $Z_{21}$ after the controller receives a command to start an automatic focusing function;

S2, gradually moving the focusing assembly between $Z_{21}$ and $Z_{22}$ by a focusing search strategy, calculating a sharpness evaluation value $T_n$ of a current projected image according to an image sharpness evaluation function, and determining whether $T_n$ is greater than a preset high sharpness threshold $T_H$, if yes, the focusing step is completed, otherwise executing step S3; and S3, determining whether $T_n$ is less than or equal to $T_{n-1}$, if yes, driving the stepper motor by the driver to operate in an opposite direction, otherwise driving the stepper motor by the driver to operate in an original direction, and then repeatedly executing step S2 until the sharpness evaluation value $T_n$ is greater than the preset high sharpness threshold $T_H$ to complete the focusing step.

For the intelligent moving head lights, after initial conditions of an optical system are determined, the coordinate positions of the zooming assembly and the focusing assembly are fixed. In fact, the reason why a projected image changes from clarity to blurring is actually that a projection distance of the light has changed. This is because a distance between a moving stage object and the light is changing at any time in a follow spot scene on the stage, and the projected image will become blurred when the moving object exceeds a range of depth of field with clear focusing in the last time. In the present invention, the projection distances $S_{max}$ and $S_{min}$ are matched to the coordinate positions $Z_{21}$ and $Z_{22}$ of the focusing assembly before and after the change thereof in the intelligent moving head light. The focusing assembly coordinate positions are moved between $Z_{21}$ and $Z_{22}$ by adopting the focusing search strategy, and whether the focusing step is completed is determined by a comparison result between the sharpness evaluation value $T_n$ and the high sharpness threshold $T_H$ of the projected image. When $T_n$ is greater than $T_H$, the focusing step is completed; when $T_n$ is less than or equal to $T_H$, it is determined whether $T_n$ is less than or equal to $T_{n-1}$. If $T_n$ is less than or equal to $T_{n-1}$, the driver drives the stepper motor to move in a direction opposite to the original movement direction; if $T_n$ is greater than $T_{n-1}$, the driver drives the stepper motor to move in the original movement direction. Then, it is determined whether to continue focusing step according to the comparison result between the sharpness evaluation value $T_n$ and the high sharpness threshold $T_H$ of the moved projected image until satisfying focusing conditions.

According to the intelligent focusing method of the present invention, the coordinate positions $Z_{21}$ and $Z_{22}$ of the focusing assembly corresponding to the prestored stage light projection distances $S_{max}$ and $S_{min}$ are calculated according to the coordinate positions of the zooming assembly and the focusing assembly. In such a way, the focusing assembly is directly positioned within this range, which shortens a focusing route, greatly shortens focusing time, and improves focusing efficiency. An automatic focusing technology and a focusing search strategy of a digital image processing technology are adopted, so that focusing state is determined according to the comparison result between the sharpness evaluation value $T_n$ and the high sharpness threshold $T_H$ of the projected image, which can obtain a maximum sharpness value, thereby achieving fine focusing and ensuring focusing accuracy.

Further, the step S1 also includes:

S11, obtaining a coordinate position $Z_1$ of the zooming assembly in the intelligent moving head light when the controller receives the command to start an automatic focusing function, calculating a coordinate position $Z_2$ of the focusing assembly correspondingly, and driving the stepper motor by the driver to position the focusing assembly to the coordinate position $Z_2$; and S12, the controller acquiring current projected image data and calculating the sharpness evaluation value $T_n$ of the current projected image according to the image sharpness evaluation function.

The coordinate position $Z_1$ of the zooming assembly in the intelligent moving head light is obtained when the controller receives the command to start the automatic focusing function, then the coordinate position $Z_2$ of the focusing assembly is calculated correspondingly, and the driver drives the stepper motor to position the focusing assembly to the coordinate position $Z_2$. Since the coordinate position $Z_2$ is a position quite close to an optimal focusing plane, positioning the focusing assembly directly to the $Z_2$ position can achieve rough focusing. Finding an optimal focusing point near the $Z_2$ position can lead to faster focusing. And the controller acquires the current projected image data to calculate and obtain the sharpness evaluation value of the projected image, which provides the foundation for determining the sharpness of the projected image by using the sharpness evaluation value in the following steps.

Further, the intelligent focusing method also includes:

S4, when the intelligent moving head light works normally, the controller monitoring the coordinate position $Z_1$ of the zooming assembly, and when the position of the zooming assembly changes, repeatedly executing the steps S1 to S3 until the focusing step is completed. For example, the position of the zooming assembly is manually changed, so that a stage light can automatically adjust the position of the focusing assembly to realize automatic focusing and keep the projection clear.

Further, the intelligent focusing method also includes:

S5, when the intelligent moving head light works normally, the controller monitoring the coordinate position $Z_1$ of the zooming assembly, and determining whether the sharpness evaluation value $T_n$ of the current projected image is greater than or equal to a preset low sharpness threshold $T_L$ when the zooming assembly position does not change, if yes, the focusing step is completed, otherwise repeatedly executing step S2 until the focusing step is completed. For example, the rotation of the stage light causes the projection distance to change, the stage light can determine whether to repeatedly execute the step S2 or not according to the comparison result between the image sharpness evaluation function $T_n$ and a low sharpness threshold $T_L$ of the current image, that is, whether to continue moving the focusing assembly or not, so that a secondary fine focusing is performed to realize a more accurate intelligent focusing function and guarantee that projected light spots are kept clear.

Further, the step S11 specifically includes:

acquiring the coordinate position $Z_1$ of the zooming assembly in the intelligent moving head light, and calculating and obtaining the coordinate position $Z_2$ of the focusing assembly through a cam curve of a two-component zoom optical system.

The present invention actually calculates a movement amount $\Delta$ of the focusing assembly by obtaining a movement amount q of the zooming assembly and using the cam curve of the two-component zoom optical system. The optical system of the intelligent moving head light is a mechanical compensation type two-component continuous zoom optical system, which is mainly composed of a front fixed lens, a zooming assembly and a focusing assembly. A specific calculation process of the movement amount $\Delta$ of the focusing assembly is that: firstly, setting the coordinate positions of the zooming assembly and the focusing assembly in long focus as an origin, so as to obtain horizontal magnifications $m_{2l}$, $m_{3l}$ and component spacing $d_{23l}$ of the zooming assembly and the focusing assembly. Then according to any movement amount q of the zooming assembly, movement amounts $\Delta_1$ and $\Delta_2$ of the focusing assembly can be obtained by using the following calculation formulas.

$$m_2 = \frac{1}{\frac{1}{m_{2l}} + \frac{q}{f_2'}}$$

$$b = -\frac{f_2'}{f_3'}\left(m_2 + \frac{1}{m_2} - m_{2l} - \frac{1}{m_{2l}}\right) + \left(m_{3l} + \frac{1}{m_{3l}}\right)$$

$$m_{31} = \frac{b + \sqrt{b^2 - 4}}{2}$$

$$m_{32} = \frac{b - \sqrt{b^2 - 4}}{2}$$

$$\Delta_1 = f_3'(m_{31} - m_{3l})$$

$$\Delta_2 = f_3'(m_{32} - m_{3l})$$

wherein $m_{2l}$ and $m_{3l}$ respectfully refers to horizontal magnifications of the zooming assembly and focusing assembly, q refers to movement amount of the zooming assembly, $f_2$ and $f_3$ respectively refer to focal length of the zooming assembly and focusing assembly under movement amount q of the zooming assembly, $\Delta_1$ and $\Delta_2$ refer to movement amounts of the focusing assembly under movement amount q of the zooming assembly.

It can be seen from the above formulas that, corresponding to any movement amount q of the zooming assembly, two horizontal magnifications $m_{31}$ and $m_{32}$ that are reciprocal to each other exist at the same time, and both roots can realize compensation of image plane of system. Therefore, for intelligent moving head lights, when the initial conditions of the optical system are determined, a focus compensation curve of the focusing assembly is determined, that is the cam curve thereof is single. The present invention uses the cam curve of the two-component zoom optical system to calculate the focusing assembly coordinate positions, thereby limiting a search range to allow a starting point of a fine focusing route of the subsequent hill-climbing search method to be closer to the optimal focusing plane, which is beneficial to shorten the focusing time and improve the focusing efficiency.

Further, the focusing search strategy is a hill-climbing search method.

The hill-climbing search method is a locally preferred focusing search strategy which starts from the sharpness evaluation value $T_n$ of the current projected image to compare with the sharpness evaluation value $T_{n-1}$ of a previous projected image. If $T_n$ is less than or equal to $T_{n-1}$, $T_{n-1}$ is a maximum value or an optimal focusing position, and the driver drives the stepper motor to operate in the direction opposite to the original movement direction at this time; if $T_n$ is greater than $T_{n-1}$, the stepper motor is continuously controlled to continue operating in the original movement direction, so as to climb to the optimal focusing position.

Further, the image sharpness evaluation function adopts a spectral function, and spectral values of the image adopts a Fourier transform function for calculation, that is, $$Y_{(n,m)} = X_{(n,m)} \cdot \exp(-j2\pi \cdot n/N) \cdot \exp(-j2\pi \cdot m/M)$$

where n=0, 1, ..., N−1, m=0, 1, ..., M−1, N represents rows of a sampled two-dimensional discrete image area N×M, M represents columns of the sampled two-dimensional discrete image area N×M, $X_{(n,m)}$ represents pixel points, and $Y_{(n,m)}$ represents frequency points.

The present invention adopts the spectral function based on the Fourier transform function, which is currently the most accurate evaluation function for sharpness evaluation. High-frequency components of the Fourier transform correspond to edges of the image, and a focused image always has sharp edges, which means that more high-frequency components are contained. Therefore, the high-frequency contents of the image after the Fourier transform is used as the evaluation function. In an image with clear focusing, a center of a two-dimensional spectrogram is a high-frequency area while the surrounding is a low-frequency area. When there are more high frequency components, spectral data is concentrated in the center, and image focusing is clearer.

Further, the calculation of the sharpness evaluation value $T_n$ of the current projected image according to the image sharpness evaluation function specifically includes: obtaining a focusing evaluation function according to the spectral values of the Fourier transform spectral evaluation function, that is, $$E\{Y_{(n,m)}\} = \frac{1}{N \cdot M} \sum_n \sum_m Y_{(n,m)}$$

$$\sigma = \sqrt{\frac{\sum_n \sum_m (Y_{(n,m)} - E\{Y_{(n,m)}\})^2}{N \cdot M}}$$

where $E\{Y(n,m)\}$ represents an average value of the frequency points, σ represents a standard deviation value, namely the sharpness evaluation value $T_n$ of the current projected image.

The standard deviation value is extracted from a spectral image and is used as the focusing evaluation function to calculate the sharpness evaluation value $T_n$ of the projected image. When the standard deviation value of the image is larger, the high-frequency components of the image occupy a larger proportion, the image is clearer, and the sharpness evaluation value $T_n$ of the projected image is larger. On the contrary, when the standard deviation value of the image is smaller, low-frequency components of the image occupy a larger proportion, the image is blurrier, and the sharpness evaluation value $T_n$ of the projected image is smaller. The present invention uses the focusing evaluation function to calculate the sharpness evaluation value of the image, which avoids a situation that local peaks occur in the Fourier transform spectral evaluation function curve, that is, a calculated optimal sharpness evaluation value is different from an actual optimal sharpness evaluation value, so that sizes of high-frequency components can be compared more accurately to achieve precise focusing.

Further, a distance between $Z_{21}$ and $Z_{22}$ occupies 15% of a maximum route of the focusing assembly.

After many experiments and tests, a maximum distance value between $Z_{21}$ and $Z_{22}$ of the machine vision-based intelligent moving head lights is 0.649 mm, and the maximum route of the focusing assembly is 4.267 mm. It can be seen that in the worst case, a ratio of the distance between $Z_{21}$ and $Z_{22}$ to the maximum stroke (0.649/4.267) *100%=15%, so that the hill-climbing search strategy that is used to limit a search range can avoid searching for invalid position sections, narrow the search range, and improve the search efficiency.

Further, the maximum value of $S_{max}$ is less than or equal to 50 m, and the minimum value of $S_{min}$ is greater than or equal to 3 m.

Further, a distance in which the focusing assembly moves gradually is from 0.2% to 0.6% of the maximum route of the focusing assembly.

The distance in which the focusing assembly moves gradually is limited to 0.2% to 0.6% of the maximum route of the focusing assembly, so that the movement distance may not be too small to result in slow focusing, nor too large to miss a sharp focusing point.

Compared with the prior art, the beneficial effects of the present invention are as follows.

The present invention uses the cam curve of the two-component zoom optical system to calculate the focusing assembly coordinate positions, and then limit the search range and directly locates the focusing assembly to a position close to the optimal focusing plane. In the worst case, the ratio of the distance between $Z_{21}$ and $Z_{22}$ to the maximum stroke of the focusing assembly is 15%, which shortens the search range, avoids searching for invalid sections, greatly shortens the focusing time and improves the focusing efficiency.

The automatic focusing technology of the digital image processing technology is adopted, and the standard deviation value is calculated according to the focusing evaluation function, which avoids a situation that local peaks occur in the Fourier transform spectral evaluation function curve, so that sizes of high-frequency components can be compared more accurately to achieve precise focusing.

EMBODIMENTS

Figure 1:
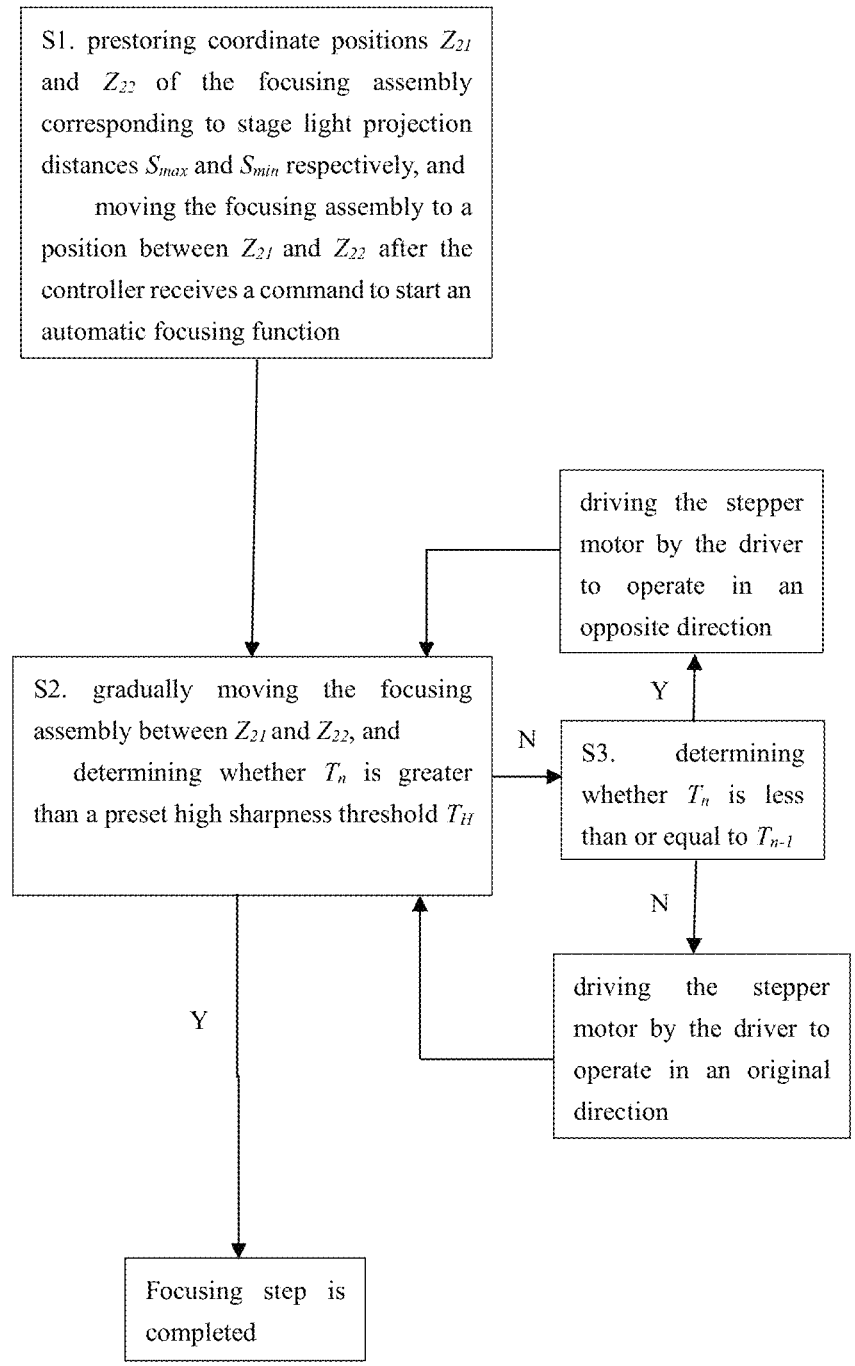
FIG. 1 is a flow chart of partial steps according to an embodiment of the present invention.

The drawings of the present invention are for illustration purpose only and are not intended to limit the present invention. Some components in the drawings may be omitted, enlarged, or reduced for better illustrating the following embodiments, and sizes of these components do not represent that of actual products. For those skilled in the art, it will be understood that some known structures and descriptions thereof in the drawings may be omitted.

Figure 2:
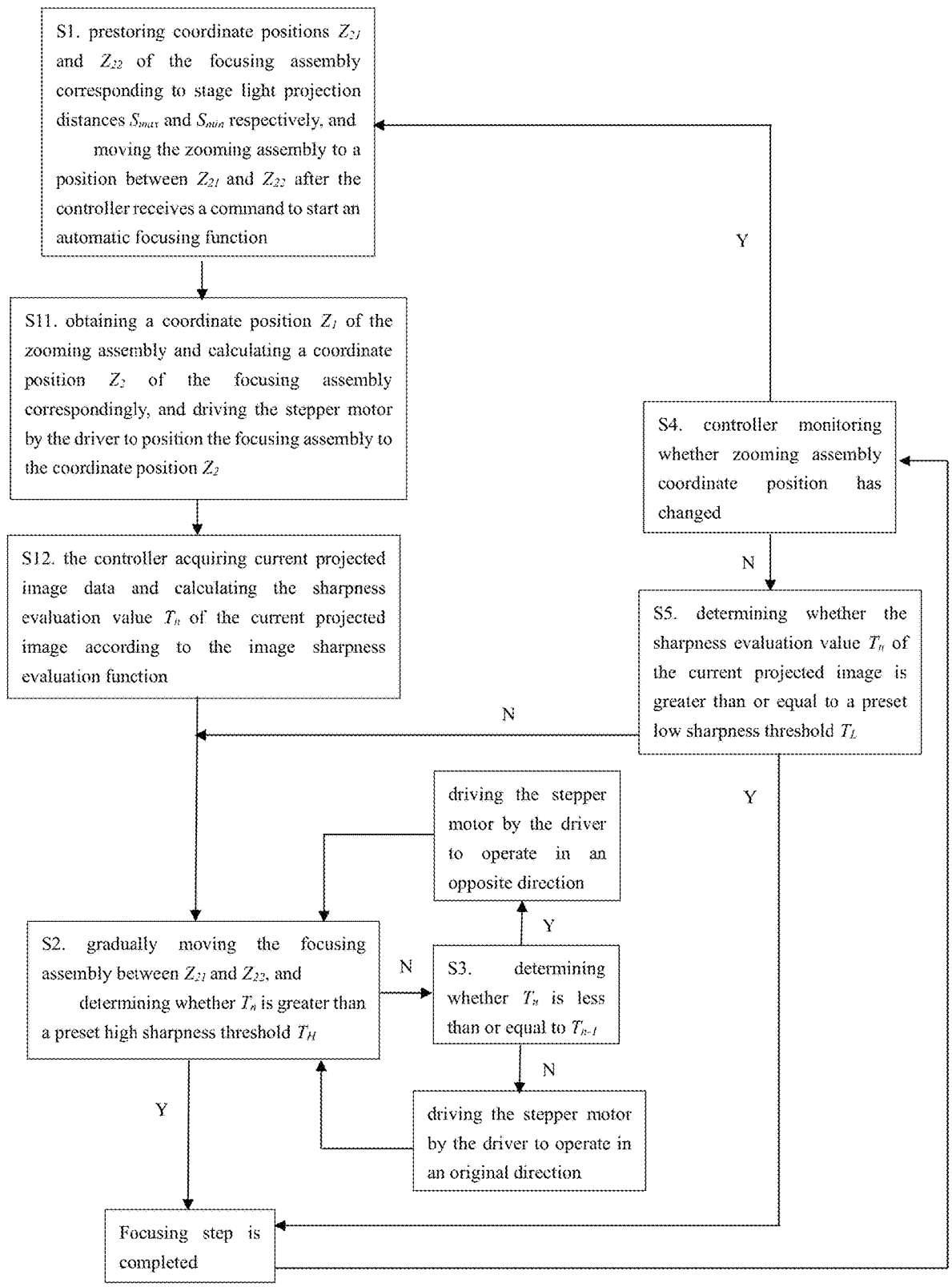
FIG. 2 is a flowchart of overall steps according to the embodiment of the present invention.

As shown in FIGS. 1 and 2, the present embodiment provides an intelligent focusing method of an intelligent moving head light based on machine vision, in which the intelligent moving head light includes a controller, a camera, a driver, a stepper motor and an optical lens assembly that includes a focusing assembly and a zooming assembly. The intelligent focusing method includes the following steps:

S1, prestoring coordinate positions $Z_{21}$ and $Z_{22}$ of the focusing assembly corresponding to stage light projection distances $S_{max}$ and $S_{min}$ respectively, and moving the focusing assembly to a position between $Z_{21}$ and $Z_{22}$ after the controller receives a command to start an automatic focusing function;

S11, obtaining a coordinate position $Z_x$ of the zooming assembly in the intelligent moving head light when the controller receives the command to start the automatic focusing function, calculating a coordinate position $Z_2$ of the focusing assembly correspondingly, and driving the stepper motor by the driver to position the focusing assembly to the coordinate position $Z_2$; and S12, the controller acquiring current projected image data and calculating the sharpness evaluation value $T_n$ of the current projected image according to an image sharpness evaluation function;

S2, gradually moving the focusing assembly between $Z_{21}$ and $Z_{22}$ by a focusing search strategy, calculating a sharpness evaluation value $T_n$ of a current projected image according to an image sharpness evaluation function, and determining whether $T_n$ is greater than a preset high sharpness threshold $T_H$, if yes, the focusing step is completed, otherwise executing step S3;

S3, determining whether $T_n$ is less than or equal to $T_{n-1}$, if yes, driving the stepper motor by the driver to operate in an opposite direction, otherwise driving the stepper motor by the driver to operate in an original direction, and then repeatedly executing step S2 until the sharpness evaluation value $T_n$ is greater than the preset high sharpness threshold $T_H$ to complete the focusing step;

S4, when the intelligent moving head light works normally, the controller monitoring the coordinate position $Z_1$ of the zooming assembly, and when the position of the zooming assembly changes, repeatedly executing the steps S1 to S3 until the focusing step is completed; and S5, when the intelligent moving head light works normally, the controller monitoring the coordinate position $Z_1$ of the zooming assembly, and determining whether the sharpness evaluation value $T_n$ of the current projected image is greater than or equal to a preset low sharpness threshold $T_L$ when the zooming assembly position does not change, if yes, the focusing step if completed, otherwise repeatedly executing step S2 until the focusing step is completed.

Preferably, the step S11 in the present embodiment specifically includes: acquiring the coordinate position $Z_1$ of the zooming assembly in the intelligent moving head light, and calculating and obtaining the coordinate position $Z_2$ of the focusing assembly through a cam curve of a two-component zoom optical system.

Preferably, the focusing search strategy described in the present embodiment is a hill-climbing search method.

Preferably, the image sharpness evaluation function in the embodiment adopts a spectral function, and spectral values of an image adopts a Fourier transform function for calculation, that is, $$Y_{(n,m)} = X_{(n,m)} \cdot \exp(-j2\pi \cdot n/N) \cdot \exp(-j2\pi \cdot m/M)$$

where $n=0, 1, \ldots, N-1$, $m=0, 1, \ldots, M-1$, N represents rows of a sampled two-dimensional discrete image area $N \times M$, M represents columns of the sampled two-dimensional discrete image area $N \times M$, $X_{(n,m)}$ represents pixel points, and $Y_{(n,m)}$ represents frequency points.

Preferably, the calculation of the sharpness evaluation value $T_n$ of the current projected image in the embodiment according to the spectral values of the image specifically includes:

$$E\{Y_{(n,m)}\} = \frac{1}{N \cdot M} \sum_n \sum_m Y_{(n,m)}$$

$$\sigma = \sqrt{\frac{\sum_n \sum_m (Y_{(n,m)} - E\{Y_{(n,m)}\})^2}{N \cdot M}}$$

where $E\{Y(n,m)\}$ represents an average value of the frequency points, $\sigma$ represents a standard deviation value, namely the sharpness evaluation value $T_n$ of the current projected image.

Preferably, a distance between $Z_{21}$ and $Z_{22}$ in this embodiment occupies 15% of a maximum route of the focusing assembly.

Preferably, in this embodiment, a maximum value of $S_{max}$ is less than or equal to 50 m, and a minimum value of $S_{min}$ is greater than or equal to 3 m.

Preferably, a distance in which the focusing assembly moves gradually in this embodiment is from 0.2% to 0.6% of the maximum route of the focusing assembly.

In order to verify the application effect of the intelligent focusing method of the intelligent moving head light based on machine vision, the following three groups of experiments were carried out on the performance thereof.

Preferably, the experiments used a CMOS camera model MER-500-7UM/UC-L, which has a maximum operating resolution of 2592×1944, about 500,000 pixels, a minimum frame rate of 7 fps, and a pixel size of 2.2 um×2.2 um. A maximum route of the zooming assembly of the selected intelligent moving head light is about 130 mm, a maximum route of the focusing assembly is about 5 mm, and a resolution of the route is 8 bits, totaling 256 equal parts. An image acquisition resolution of the camera was set to 640*480 to increase an acquisition frame rate to 60 fps; the camera was set to an auto-exposure mode to prevent overexposure of the acquired image.

Experiment 1 aimed to verify the image sharpness of automatic focusing. In actual situations, the position of the zooming assembly was fixed for different projection distances, and the same intelligent moving head light was used to carry out automatic focusing test experiments for several times. Experiment 1 selected a projection distance of 4 to 35 meters for testing since such projection range had met most stage application requirements. The results of Experiment 1 are shown in Table 1.

TABLE 1

Average values of multiple tests at different focusing positions with different projection distances when fixing zooming assembly position

| Projection distance/ m | Focusing evaluation function value | Actual focusing plane position/ mm | Auto-focusing focusing plane position/ mm | Focusing plane deviation/ mm |
|---|---|---|---|---|
| 4.0 | 1.34270 | 4.078 | 4.066 | −0.012 |
| 5.0 | 1.32839 | 3.922 | 3.940 | 0.018 |
| 6.0 | 1.34218 | 3.843 | 3.858 | 0.015 |
| 7.0 | 1.33548 | 3.765 | 3.749 | −0.016 |
| 8.0 | 1.34631 | 3.686 | 3.695 | 0.009 |
| 9.0 | 1.33725 | 3.529 | 3.535 | 0.006 |
| 10.0 | 1.35344 | 3.373 | 3.363 | −0.010 |
| 11.0 | 1.32987 | 3.294 | 3.286 | −0.008 |
| 12.0 | 1.33469 | 3.216 | 3.235 | 0.019 |

TABLE 1-continued

Average values of multiple tests at different focusing positions with different projection distances when fixing zooming assembly position

| Projection distance/ m | Focusing evaluation function value | Actual focusing plane position/ mm | Auto-focusing focusing plane position/ mm | Focusing plane deviation/ mm |
|---|---|---|---|---|
| 13.0 | 1.28865 | 3.137 | 3.149 | 0.012 |
| 14.0 | 1.32680 | 3.059 | 3.052 | −0.007 |
| 15.0 | 1.34319 | 2.980 | 2.970 | −0.010 |
| 20.0 | 1.31864 | 2.824 | 2.837 | 0.013 |
| 25.0 | 1.32383 | 2.745 | 2.724 | −0.020 |
| 30.0 | 1.30515 | 2.667 | 2.687 | 0.023 |
| 35.0 | 1.31187 | 2.588 | 2.571 | −0.017 |

From the experimental data in Table 1, it can be seen that: a maximum deviation between the auto-focusing focusing plane position and the actual focusing plane position was ±0.023 mm, which indicates that the intelligent moving head light based on machine vision in the present invention can meet the requirements of focusing precision and image sharpness.

Figure 3:
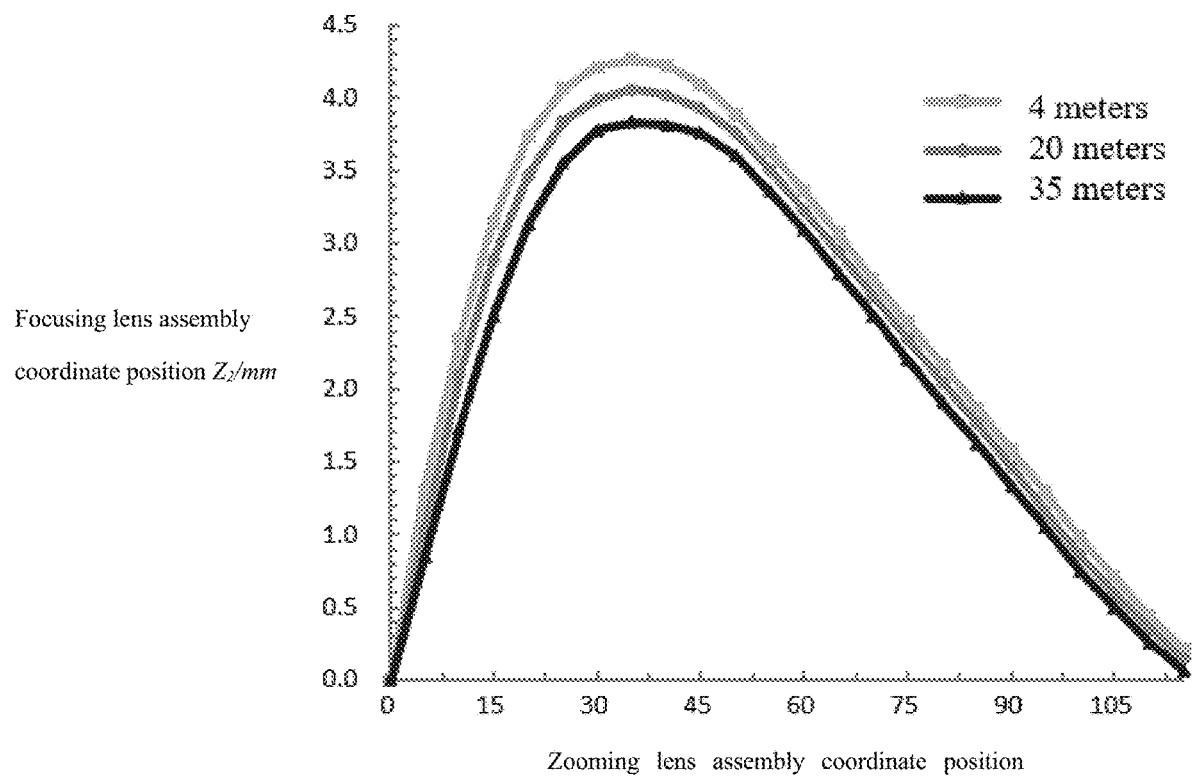
FIG. 3 shows cam curves formed by coordinate positions of a zooming assembly and a focusing assembly with different projection distances.
Figure 4:
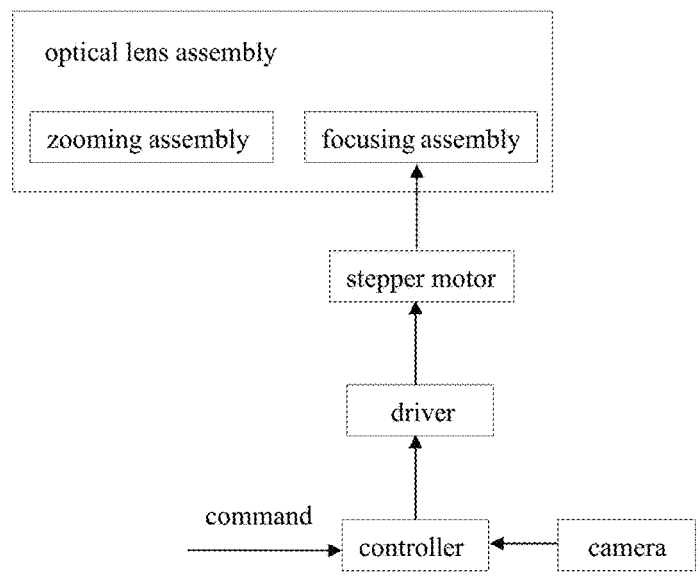
FIG. 4 is a block diagram of signal control of the intelligent moving head light according to the present embodiment of the present invention.

Experiment 2 aimed to obtain the cam curve of the two-component zoom optical system by calculating a focusing assembly coordinate position $Z_2$ corresponding to a zooming assembly coordinate position $Z_1$, and limit a search range $\Delta Z_2$. From average values of multiple test data, the cam curve as shown in FIG. 3 and the limited search range $\Delta Z_2$ as shown in Table 2 were obtained.

TABLE 2

Coordinate positions of zooming assembly and focusing assembly and limited search range

| Zooming assembly coordinate position $Z_1$/mm | 4-meter distance focusing assembly coordinate position $Z_{2\_4}$/mm | 35-meter distance focusing assembly coordinate position $Z_{2\_35}$/mm | Limited search range $\Delta Z_2$/ mm |
|---|---|---|---|
| 0.0 | 0.000 | 0.000 | 0.000 |
| 5.0 | 1.307 | 0.844 | 0.462 |
| 10.0 | 2.347 | 1.724 | 0.622 |
| 15.0 | 3.147 | 2.498 | 0.649 |
| 20.0 | 3.733 | 3.129 | 0.604 |
| 25.0 | 4.062 | 3.556 | 0.507 |
| 30.0 | 4.213 | 3.778 | 0.436 |
| 35.0 | 4.267 | 3.831 | 0.436 |
| 40.0 | 4.222 | 3.813 | 0.409 |
| 45.0 | 4.089 | 3.760 | 0.329 |
| 50.0 | 3.884 | 3.600 | 0.284 |
| 55.0 | 3.636 | 3.360 | 0.276 |
| 60.0 | 3.360 | 3.093 | 0.267 |
| 65.0 | 3.067 | 2.800 | 0.267 |
| 70.0 | 2.756 | 2.507 | 0.249 |
| 75.0 | 2.462 | 2.204 | 0.258 |
| 80.0 | 2.169 | 1.911 | 0.258 |
| 85.0 | 1.867 | 1.627 | 0.240 |
| 90.0 | 1.582 | 1.333 | 0.249 |
| 95.0 | 1.289 | 1.049 | 0.240 |
| 100.0 | 0.987 | 0.756 | 0.231 |
| 105.0 | 0.711 | 0.498 | 0.213 |
| 110.0 | 0.444 | 0.258 | 0.187 |
| 115.0 | 0.222 | 0.062 | 0.160 |

From the experimental data in FIG. 3 and Table 2, it can be seen that: a maximum value of the limited search range $\Delta Z_2$ was 0.649 mm, the maximum route of the focusing assembly was 4.267 mm, so that in the worst case, a ratio of the maximum search range to the maximum stroke of the focusing assembly was: (0.649/4.267)*100%≈15%. Therefore, the $\Delta Z_2$ parameter was used as the limited search range of the hill-climbing method, which can avoid searching for invalid position sections, narrow the search range, and improve the search efficiency.

Experiment 3 aimed to compare the automatic focusing time with and without a cam curve algorithm for several times by using the same intelligent moving head light as to different projection distances in a case where the zooming assembly coordinate position was fixed. The experimental data is shown in Table 3.

TABLE 3

Average values of multiple tests of automatic focusing time for programs with and without cam curve algorithm

| Projection distance/m | Automatic focusing time without cam curve/s | Automatic focusing time with cam curve/s | Time-consuming ratio/% |
|---|---|---|---|
| 4.0 | 4.1 | 0.7 | 17 |
| 10.0 | 3.9 | 0.5 | 13 |
| 15.0 | 4.0 | 0.6 | 15 |
| 20.0 | 4.2 | 0.9 | 21 |
| 25.0 | 4.5 | 1.0 | 22 |
| 30.0 | 4.3 | 0.9 | 21 |
| 35.0 | 4.4 | 0.8 | 18 |

From the experimental data in Table 3, it can be seen that: automatic focusing time-consuming ratio with and without cam curve algorithm=(automatic focusing time with cam curve/automatic focusing time without cam curve)×100%. Therefore, in a projection range of 4 to 35 meters, the time-consuming ratio is about 13 to 22%, that is, the program with the cam curve algorithm takes less time to complete the automatic focusing and has higher focusing efficiency.

According to the intelligent focusing method of the intelligent moving head light based on machine vision, the cam curve of the two-component zoom optical system is used to calculate a limited search range, and positioning the focusing assembly to a position close to an optimal focusing plane achieves rough focusing; an automatic focusing technology of a digital image processing technology is adopted, and a spectral evaluation function with threshold determination and the hill-climbing search method are selected to achieve fine focusing. Through the above three experiments, it can be seen that: in the projection range of 4 to 35 meters, the maximum deviation between the auto-focusing focusing plane position and the actual focusing plane position was ±0.023 mm, which can meet the requirements of focusing precision and image sharpness; in the worst case, a ratio of the maximum search range to the maximum route of the focusing assembly was about 15%, which shortens the search range and avoids searching for invalid sections; the time-consuming ratio for completing the automatic focusing by the programs with and without cam curve algorithm is about 13 to 22%, that is, the program with the cam curve algorithm takes less time to complete the automatic focusing, and improves the real-time performance of the automatic focusing.

Obviously, the above embodiments of the present invention are merely examples for clear illustration of the technical solution in the invention, and are not intended to limit the implementations of the present invention. Any modification, equivalent substitution, improvement, or the like within the spirit and principle of the claims of the invention should be included in the scope of the claims of the invention.

The invention claimed is:

1. An intelligent focusing method of an intelligent moving head light based on machine vision, wherein the intelligent moving head light comprises a controller, a camera, a driver, a stepper motor and an optical lens assembly that includes a focusing assembly and a zooming assembly; the intelligent focusing method comprising the following steps:

S1) prestoring coordinate positions $Z_{21}$ and $Z_{22}$ of the focusing assembly corresponding to stage light projection distances $S_{max}$ and $S_{min}$ respectively, and moving the focusing assembly, via the stepper motor driven by the driver, to a position between $Z_{21}$ and $Z_{22}$ after the controller receives a command to start an automatic focusing function;

S2) gradually moving the focusing assembly between $Z_{21}$ and $Z_{22}$ by a focusing search strategy, the controller calculating a sharpness evaluation value $T_n$ of a current projected image acquired by the camera according to an image sharpness evaluation function, and determining whether $T_n$ is greater than a preset high sharpness threshold $T_H$, if yes, the focusing step is completed, otherwise executing step S3; and S3) determining whether $T_n$ is less than or equal to $T_{n-1}$, if yes, driving the stepper motor by the driver to operate in an opposite direction, otherwise driving the stepper motor by the driver to operate in an original direction, and then repeatedly executing step S2 until the sharpness evaluation value $T_n$ is greater than the preset high sharpness threshold $T_H$ to complete the focusing step.

2. The intelligent focusing method of the intelligent moving head light based on machine vision according to claim 1, wherein the step S1 further includes:

S11) obtaining a coordinate position $Z_1$ of the zooming assembly in the intelligent moving head light when the controller receives the command to start the automatic focusing function, calculating a coordinate position $Z_2$ of the focusing assembly correspondingly, and driving the stepper motor by the driver to position the focusing assembly to the coordinate position $Z_2$; and S12) the controller acquiring current projected image data and calculating the sharpness evaluation value $T_n$ of the current projected image according to the image sharpness evaluation function.

3. The intelligent focusing method of the intelligent moving head light based on machine vision according to claim 1, further comprising:

S4) the controller monitoring a coordinate position $Z_1$ of the zooming assembly, and when the position of the zooming assembly changes, repeatedly executing the steps S1 to S3 until the focusing step is completed.

4. The intelligent focusing method of the intelligent moving head light based on machine vision according to claim 1, further comprising:

S5) the controller monitoring a coordinate position $Z_1$ of the zooming assembly, and when the zooming assembly position does not change, determining whether the sharpness evaluation value $T_n$ of the current projected image is greater than or equal to a preset low sharpness threshold $T_L$, if yes, the focusing step is completed, otherwise repeatedly executing step S2 until the focusing step is completed.

5. The intelligent focusing method of the intelligent moving head light based on machine vision according to claim 2, wherein the step S11 specifically comprises:

acquiring the coordinate position $Z_1$ of the zooming assembly in the intelligent moving head light, and calculating the coordinate position $Z_2$ of the focusing assembly through a cam curve of a two-component zoom optical system.

6. The intelligent focusing method of the intelligent moving head light based on machine vision according to claim 1, wherein the focusing search strategy is a hill-climbing search method.

7. The intelligent focusing method of the intelligent moving head light based on machine vision according to claim 1, wherein the image sharpness evaluation function is a spectral function, and spectral values of an image is calculated by a Fourier transform function, that is, $$Y_{(n,m)} = X_{(n,m)} \cdot \exp(-j2\pi \cdot n/N) \cdot \exp(-j2\pi \cdot m/M)$$

where n=0, 1, ..., N−1, m=0, 1, ..., M−1, N represents rows of a sampled two-dimensional discrete image area N×M, M represents columns of the sampled two-dimensional discrete image area N×M, $X_{(n,m)}$ represents pixel points, and $Y_{(n,m)}$ represents frequency points.

8. The intelligent focusing method of the intelligent moving head light based on machine vision according to claim 7, wherein the calculation of the sharpness evaluation value $T_n$ of the current projected image according to the spectral values of the image specifically includes:

$$E\{Y_{(n,m)}\} = \frac{1}{N \cdot M} \sum_n \sum_m Y_{(n,m)}$$

$$\sigma = \sqrt{\frac{\sum_n \sum_m (Y_{(n,m)} - E\{Y_{(n,m)}\})^2}{N \cdot M}}$$

where $E\{Y(n,m)\}$ represents an average value of the frequency points, σ represents a standard deviation value, wherein σ refers to the sharpness evaluation value $T_n$ of the current projected image.

9. The intelligent focusing method of the intelligent moving head light based on machine vision according to claim 1, wherein a distance between $Z_{21}$ and $Z_{22}$ occupies 15% of a maximum route of the focusing assembly.

10. The intelligent focusing method of the intelligent moving head light based on machine vision according to claim 1, wherein a maximum value of $S_{max}$ is less than or equal to 50 m, and a minimum value of $S_{min}$ is greater than or equal to 3 m.

11. The intelligent focusing method of the intelligent moving head light based on machine vision according to claim 1, wherein a distance in which the focusing assembly moves gradually is from 0.2% to 0.6% of a maximum route of the focusing assembly.

* * * * *